Sept. 3, 1968 N. B. JACOB 3,400,261
ADAPTER FOR CAMERA
Filed Oct. 18, 1965
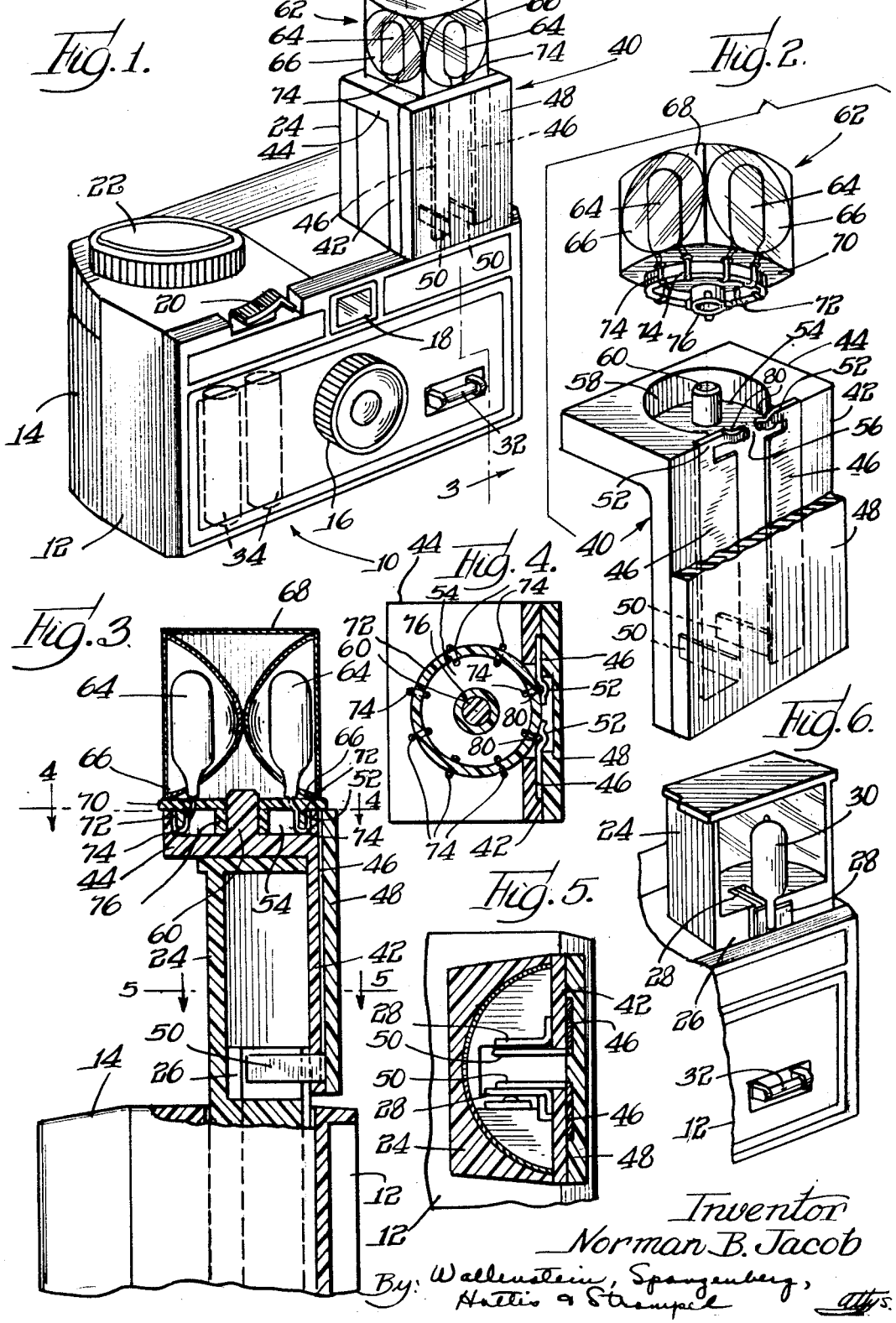
Inventor
Norman B. Jacob
By: Wallenstein, Spangenberg,
Hattis & Strampel
Attys.

United States Patent Office 3,400,261
Patented Sept. 3, 1968

3,400,261
ADAPTER FOR CAMERA
Norman B. Jacob, 7509 Palma Lane,
Morton Grove, Ill. 60053
Filed Oct. 18, 1965, Ser. No. 497,123
6 Claims. (Cl. 240—1.3)

ABSTRACT OF THE DISCLOSURE

An adapter for a flash camera which is removably mechanically associated with the flash reflector of the camera, and which enables a multilamp flash unit to be used with the camera in place of a single flash lamp normally employed with the camera. In its preferred form, the adapter comprises a body member having two pairs of contacts, one pair being adapted to engage the flash lamp receiving and energizing contacts of the camera, and the other pair being adapted successively to engage the contacts of the multilamp flash unit.

---

This invention relates to an adapter for a camera having a flash mechanism for enabling the flash mechanism to accommodate a multiple-flash lamp reflector unit.

Until recently, the flash mechanism of a camera, generally speaking, was normally able to accommodate only a single flash bulb or lamp. After each film exposure, the spent flash lamp was released from the contacts of the flash reflector associated with the flash mechanism of the camera and a fresh flash lamp was engaged with the contacts in preparation for the next exposure. The necessity for removing and replacing flash lamps for each film exposure was cumbersome and time consuming, and not infrequently resulted in singed fingers from slow-cooling spent flash lamps.

Flash cameras have now been developed which have a flash mechanism capable of accommodating a specially constructed rotatable multiple-flash lamp reflector unit. Such cameras are available commercially under the trademark "Instamatic" (Kodak), and the multiple-flash lamp reflector units used with the cameras are sold under the trade designation "Flash Cubes" (Sylvania). These flash cameras and units permit, automatically, four successive film exposures to be made with each unit. Purchasers of such cameras, of course, are fortunate in that they can realize the benefits of the conveniences offered thereby. However, before the introduction of these flash cameras on the market, large numbers of cameras, including earlier models sold under the aforementioned trademark "Instamatic," were purchased which, heretofore, could only accommodate a single flash lamp.

In accordance with the present invention, there is provided an adapter for a camera flash mechanism, normally capable of accommodating only a single flash lamp, which enables the flash mechanism to accommodate a rotatable multiple-flash reflector unit of the type hereinabove referred to, and presently used with the latest "Instamatic" flash cameras. The adapter of this invention not only affords owners of flash cameras, particularly owners of the single flash lamp "Instamatic" type camera, the conveniences of a multiple-flash lamp reflector unit, but achieves this end without requiring any modification in the structure of the cameras and at nominal expense to the user. The adapter is light in weight, easy to secure in position, and fool-proof in operation. It can be manufactured from inexpensive, readily available materials, and does not require any special machining or other cost-increasing finishing operation.

Briefly, the adapter of the present invention comprises a body member having an upper portion for receiving a rotatable multiple-flash lamp reflector unit. The body member carries a pair of conductors which provide a lower pair of contacts for engaging the flash lamp energizing contacts of the camera flash mechanism, and an upper pair of contacts for successively engaging the contacts of the respective flash lamps comprising the rotatable multiple-flash lamp reflector unit as the unit is rotated on the upper portion of the body member. As indicated, the adapter of this invention is especially suitable for use in connection with "Instamatic" flash camera equipped with a flash mechanism capable of accommodating only a single flash lamp. The flash mechanism of such a camera comprises, in the main, a shutter mechanism, a flash reflector movable from a retracted, nonexposed position in the housing of the camera into an exposed position at the top and to one side of the housing of the camera, and a flash circuit which includes a pair of 1.5 volt batteries. The flash reflector, at its base, is provided with a pair of flash lamp energizing contacts which, as stated, engage the lower pair of contacts of the conductors of the adapter of this invention when the flash reflector is in its exposed position. The rotatable multiple-flash lamp reflector unit used with the adapter of the present invention is generally cubiform in shape and carries four flash bulbs or lamps with associated reflectors. The unit has a base portion provided with a downwardly extending sleeve for rotatably mounting the unit and a downwardly extending annular wall portion which carries paired, circumferentially arranged contacts connected respectively to the flash lamps of the unit. As described hereinabove, the contacts of the respective flash lamps of the unit engage the upper pair of contacts of the conductors of the adapter as each flash lamp of the unit is successively rotated into position for illuminating a subject to be photographed by the camera. Rotation of the unit is performed manually, and requires minimal effort on the part of the user.

Other objects, advantages and features of the present invention will become apparent upon making reference to the specification and the drawings wherein:

FIG. 1 is an embodiment of the adapter of this invention mounted on the flash reflector of a camera and carrying a multiple-flash lamp reflector unit;

FIG. 2 is an exploded view of said embodiment of the adapter and the multiple-flash lamp reflector unit with a portion of the adapter broken away;

FIG. 3 is a vertical sectional view taken substantially along line 3—3 of FIG. 1;

FIG. 4 is a horizontal sectional view taken substantially along line 4—4 of FIG. 3;

FIG. 5 is a horizontal sectional view taken substantially along line 5—5 of FIG. 3; and FIG. 6 is a fragmentary view in perspective showing the flash reflector of the camera of FIG. 1 in its normally operative position with a single flash lamp mounted therein.

Referring now in particular to FIG. 1 of the drawing, an embodiment of the adapter of the present invention is shown mounted on a flash camera designated at 10. The camera 10 is typical of a number of models of flash cameras available commercially under the trademark "Instamatic." The construction and operation of the camera 10 are well known in the art and, therefore, no detailed description of the camera will be undertaken herein. Briefly, the camera 10 comprises a case 12 having a hinged back 14. The case 12 carries a lens and shutter housing 16, a view finder 18, a shutter actuating lever 20, and a film winding knob 22. As best illustrated in FIG. 6, the camera 10 also has a retractable flash reflector 24 which is provided at its base 26 with a pair of spring-biased flash lamp energizing contacts 28—28 for normally receiving a single flash bulb or lamp 30. The flash reflector 24 can be retracted from a nonexposed position in the case 12 to an exposed position, as illustrated in FIGS. 1 and 6, by means of a spring release bar 32. The camera 10 further is provided with a flash circuit (not shown) which includes a pair of dry cell batteries 34—34 carried in the case 12.

The embodiment of the adapter of the present invention illustrated, designated at 40, advantageously comprises a conductor carrying portion 42 joined to a multiple-flash lamp reflector unit carrying portion 44. The portions 42 and 44 of the adapter 40 desirably are of unitary construction and can be fabricated of any rigid, lightweight, nonconductive material such as wood, plastic, or the like. The adapter 40 has a pair of conductors 46—46 preferably formed of tempered spring steel. The conductors 46—46 are maintained on the portion 42 in spaced apart relation with respect to one another by means of a face plate 48 which may be formed of the same material as the portions 42 and 44, and which can be secured to the portion 42 by any suitable means.

The conductors 46—46, at their lower ends, are formed into a pair of contacts 50—50 for engaging the contacts 28—28 at the base 26 of the flash reflector 24 when the latter is in its exposed position. The conductors 46—46, at their upper ends, are formed into a pair of resilient contacts 52—52, the function of which will become clear as the description proceeds.

The portion 44 of the embodiment of the adapter 40 illustrated has an annular recess 54 having a gap or opening 56 in the side wall 58 thereof opposite the resilient contacts 52—52 of the conductors 46—46. An upwardly extending mounting pin 60 is positioned substantially concentrically in the base of the recess 54.

As stated hereinabove, the adapter 40 enables the flash mechanism of the camera 10 to accommodate a rotatable, cube-like multiple-flash lamp reflector unit. An embodiment of such a unit, designated at 62, is illustrated in the drawing. As best shown in FIG. 2, the unit 62 has a flash bulb or lamp 64 and a reflector 66 positioned in each of its four vertical sides. The lamps and reflectors are encased in a transparent, heat-resistant housing 68 which is secured to a base member 70. The base member 70 of the unit 62 has a downwardly extending annular wall portion 72 which carries a plurality of paired circumferentially arranged contacts 74—74. Each pair of the contacts 74—74 is associated with a different one of the respective flash lamps comprising the unit 62. The base 70 further is provided with a centrally positioned, downwardly extending tubular member or sleeve 76 for rotatably mounting the unit 62.

In utilizing the adapter of the present invention, it is merely necessary to first depress the release bar 32 to free the flash reflector 24, and then raise the flash reflector 24 to its fully exposed position. The lower pair of contacts 50—50 of the adapter 40 are then engaged with the spring-biased contacts 28—28 at the base 26 of the flash reflector 24 (see FIG. 5). In this position, as best illustrated in FIGS. 1 and 3 of the drawing, the conductor carrying portion 42 of the adapter 40 substantially covers the face of the flash reflector 24 and the upper portion 44 of the adapter 40 overlies the top of the flash reflector 24. The rotatable, multiple-flash lamp reflector unit 62 is then mounted on the upper portion 44 by engaging the sleeve 76 of the unit 62 with the mounting pin 60 of the adapter 40. The annular recess 54 in the upper portion 44 has a diameter slightly greater than the diameter of the annular wall portion 72 of the unit 62, and has a depth sufficient to enable the outer areas of the base member 70 of the unit 62 to rest on the upper surface of the portion 44 of the adapter 40. This arrangement provides greater stability for the unit 62 while taking flash lamp-illuminated photographs with the camera.

As the unit 62 is manually rotated on the upper portion 44 of the adapter 40, each pair of contacts 74—74 of the respective flash lamps 64 of the unit 62 are successively moved into the gap 56 in the wall 58 of the recess 54 and snapped into engagement with the resilient contacts 52—52 of the adapter 40. As best shown in FIG. 4, each of the resilient contacts 52—52 is indented, as designated at 80, to enhance the contacts 74—74 holding capabilities of the contacts 52—52 and thereby to prevent inadvertent disengagement of the contacts 52—52 and 74—74 from one another. As the contacts 74—74 snap into engagement with the contacts 52—52, there is an audible clicking sound generated which serves as a useful signal to the user that a lamp 64 of the unit 62 is in proper position on the adapter for illuminating a subject to be photographed. Successive energization of each lamp 64 of the unit 62 is accomplished in the same manner as with a single lamp 30. Depression of the shutter actuating lever 20 completes a flash lamp 64 energizing circuit which includes in series circuit relation the batteries 34—34, the contacts 28—28 of the flash reflector 24, the contacts 50—50 and 52—52 of the conductors 46—46, and the contacts 74—74 of each lamp 64 of the unit 62.

The adapter of the present invention simply, efficiently and effectively enables a single flash lamp accommodating flash mechanism to accommodate a multiple-flash lamp reflector unit. It should be understood that while the invention has been described in detail with relation to its utility in connection with a specific type of flash camera and flash mechanism, variations and modifications of the adapter can be effected to enable it to be used with other types of flash cameras and flash mechanisms without departing from the spirit and scope of this invention.

I claim:

1. An adapter for use with a flash camera having a flash mechanism including a flash reflector, a source of electric potential and pair of flash lamp engaging and energizing contacts for normally firing a single flash lamp, the adapter enabling the flash mechanism of the flash camera to accommodate a rotatable multiple-flash lamp reflector unit having mounting means at the base thereof for rotatably mounting the unit and a plurality of circumferentially arranged contacts connected respectively to the flash lamps of said unit, said adapter being removably mechanically associated with the flash reflector of the camera and comprising a body member having two pairs of interconnected contacts, one of said pairs of contacts being connected to the source of electric potential of the flash camera through the flash lamp energizing contacts thereof, the other of said pairs of contacts being adapted for successively engaging the circumferentially arranged contacts of the respective flash lamps of said multiple-flash lamp reflector unit as the unit is rotated, and mounting means on the body member which cooperates with the mounting means of the multiple-flash lamp reflector unit for rotatably mounting said unit on the body member to enable each flash lamp of said unit to be successively rotated into position for illuminating a subject to be photographed by the camera and to cause the contracts of each such flash lamp to engage said other of the pairs of contacts thereby successively to connect the contacts of each such flash lamp to the source of electric potential of the flash camera.

2. An adapter in accordance with claim 1 wherein one member of each of said two pairs of interconnected contacts is formed in spaced apart relation on a unitary, electrical conductor.

3. An adapter for a flash camera, having a flash mechanism including a flash reflector movable from a non-exposed position into an exposed position and a pair of flash lamp energizing contacts positioned at the base of said flash reflector for normally receiving a single flash lamp, for enabling the flash mechanism of the flash camera to accommodate a rotatable, generally cubiform, multiple-flash lamp reflector unit carrying four flash lamps with associated reflectors, said unit having a base portion provided with a downwardly extending sleeve for rotatably mounting the unit and a downwardly extending annular wall portion carrying paired circumferentially arranged contacts connected respectively to the flash lamps of said unit, said adapter comprising a body member having an upper flash reflector overlying portion joined to a downwardly extending conductor carrying portion, a pair of conductors carried by said conductor carrying portion of the body member, said conductors having a pair of contacts at the base thereof for engaging the flash lamp energizing contacts associated with the flash reflector when the reflector is in its exposed position and a pair of resilient contacts at the upper end thereof for resiliently releasably successively engaging the circumferentially arranged paired contacts of the respective flash lamps of said multiple-flash lamp reflector unit as the unit is rotated, and mounting means in the upper portion of said body member, said mounting means including an annular recess for receiving said annular wall portion of said multiple-flash lamp reflector unit and an upwardly extending pin for engaging the sleeve of said unit, said recess providing access to the resilient contacts of said conductors and cooperating with said pin for enabling each flash lamp of said multiple-flash lamp reflector unit to be successively rotated into position for illuminating a subject to be photographed by the camera and to cause the paired contacts of each such flash lamp to engage the resilient contacts of the adapter.

4. In combination with a flash camera having a flash mechanism including a source of electric potential, a flash reflector and a pair of flash lamp energizing contacts associated with said flash reflector and connected to the source of electric potential for normally receiving a single flash lamp, an adapter for enabling the flash mechanism of the flash camera to accommodate a rotatable multiple-flash lamp reflector unit having mounting means for rotatably mounting the unit and a plurality of circumferentially arranged contacts connected respectively to the flash lamps of said unit, said adapter comprising a body member removably mechanically associated with the flash reflector of the camera, contact means carried by said body member for engaging the flash lamp energizing contacts associated with the flash reflector and for successively engaging the circumferentially arranged contacts of the respective flash lamps of said multiple-flash lamp reflector unit as the unit is rotated, and mounting means for said body member cooperating with the mounting means of said multiple-flash lamp reflector unit for rotatably mounting said unit on said body member to enable each flash lamp of said unit to be successively rotated into position for illuminating a subject to be photographed by the camera and to cause the contacts of each such flash lamp to engage the contact means of the adapter whereby said contacts of each such flash lamp will be successively connected to the source of electric potential included in said flash mechanism of the flash camera.

5. In combination with a flash camera having a flash mechanism including a flash reflector and a pair of flash lamp energizing contacts associated with said flash reflector for normally receiving a single flash lamp, an adapter for enabling the flash mechanism of the flash camera to accommodate a rotatable multiple-flash lamp reflector unit having mounting means at the base thereof for rotatably mounting the unit and a plurality of circumferentially arranged contacts connected respectively to the flash lamps of said unit, said adapter comprising a body member removably mechanically associated with the flash reflector, contact means carried by said body member including a pair of contacts for engaging the flash lamp energizing contacts associated with the flash reflector and a pair of resilient contacts for successively engaging the circumferentially arranged contacts of the respective flash lamps of said multiple-flash lamp reflector unit as the unit is rotated, and mounting means including a recess in said body member for receiving the base of said unit, said mounting means cooperating with the mounting means of said multiple-flash lamp reflector unit for rotatably mounting said unit on said body member to enable each flash lamp of said unit to be successively rotated into position for illuminating a subject to be photographed by the camera and to cause the contacts of each such flash lamp to engage the resilient contact means of the adapter.

6. In combination with a flash camera having a flash mechanism including a flash reflector movable from a non-exposed position into an exposed position and a pair of flash lamp energizing contacts positioned at the base of said flash reflector for normally receiving a single flash lamp, an adapter for enabling the flash mechanism of the flash camera to accommodate a rotatable, generally cubiform, multiple-flash lamp reflector unit carrying four flash lamps with associated reflectors, said unit having a base portion provided with a downwardly extending sleeve for rotatably mounting the unit and a downwardly extending annular wall portion carrying paired circumferentially arranged contacts connected respectively to the flash lamps of said unit, said adapter comprising a body member having an upper flash reflector overlying portion joined to a downwardly extending conductor carrying portion, a pair of conductors carried by said conductor carrying portion of the body member, said conductors having a pair of contacts at the base thereof for engaging the flash lamp energizing contacts associated with the flash reflector when the reflector is in its exposed position and a pair of resilient contacts at the upper end thereof for resiliently releasably successively engaging the circumferentially arranged paired contacts of the respective flash lamps of said mutliple-flash lamp reflector unit as the unit is rotated, and mounting means in the upper portion of said body member, said mounting means including an annular recess for receiving said annular wall portion of said multiple-flash lamp reflector unit and an upwardly extending pin for engaging the sleeve of said unit, said recess providing access to the resilient contacts of said conductors and cooperating with said pin for enabling each flash lamp of said multiple-flash lamp reflector unit to be successively rotated into position for illuminating a subject to be photographed by the camera and to cause the paired contacts of each such flash lamp to engage the resilient contacts of the adapter.

References Cited
UNITED STATES PATENTS 3,205,801    9/1965    Peterson _____ 95—11.5
3,353,465    11/1967    Peterson et al. _____ 95—11.5

NORTON ANSHER, *Primary Examiner.*

FRED L. BRAUN, *Assistant Examiner.*